(12) United States Patent
Miyatake et al.

(10) Patent No.: US 8,649,093 B2
(45) Date of Patent: Feb. 11, 2014

(54) POLARIZING FIBER, POLARIZER, POLARIZING PLATE, LAMINATED OPTICAL FILM, AND IMAGE DISPLAY

(71) Applicant: Nitto Denko Corporation, Ibaraki (JP)

(72) Inventors: Minoru Miyatake, Ibaraki (JP); Akinori Nishimura, Ibaraki (JP); Masashi Shinagawa, Ibaraki (JP); Yasuko Iwakawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/692,696

(22) Filed: Dec. 3, 2012

(65) Prior Publication Data
US 2013/0088778 A1    Apr. 11, 2013

Related U.S. Application Data

(62) Division of application No. 12/523,223, filed as application No. PCT/JP2008/060262 on Jun. 4, 2008, now abandoned.

(30) Foreign Application Priority Data

Jun. 19, 2007 (JP) ................ 2007-161408

(51) Int. Cl.
*G02B 5/30* (2006.01)
*G02B 6/00* (2006.01)

(52) U.S. Cl.
USPC ......... 359/487.02; 385/11; 385/115; 385/141

(58) Field of Classification Search
USPC ............ 359/487.02; 385/11, 115, 141, 146
See application file for complete search history.

(56) References Cited

U.S. PATENT DOCUMENTS

| | | | |
|---|---|---|---|
| 2,346,766 A | 4/1944 | Land | |
| 2,687,673 A | 8/1954 | Boone | |
| 3,245,316 A | 4/1966 | Janetos et al. | |

(Continued)

FOREIGN PATENT DOCUMENTS

| | | |
|---|---|---|
| EP | 1876477 A1 | 1/2008 |
| JP | 9-171109 A | 6/1997 |

(Continued)

OTHER PUBLICATIONS

International Search Report of PCT/JP2008/060262, Mailing Date of Jul. 1, 2008.

(Continued)

*Primary Examiner* — Ricky D Shafer
(74) *Attorney, Agent, or Firm* — Westerman, Hattori, Daniels & Adrian, LLP

(57) ABSTRACT

As the polarizing fiber of the present invention, the cross sectional form perpendicular to the longitudinal direction has a sea-island structure, and the cross sectional form is continuously made up in the longitudinal direction. A resin (sea component) that constitutes the sea region of the sea-island structure comprises a dichroic dye, and a resin (island component) that constitutes the island regions of the sea-island structure is a transparent resin. The polarizing fiber of the present invention may be used as a forming material of a polarizer, for example. By using the above polarizing fiber, a polarizer wherein unevenness of the transmittance is small and cracks are less generated may be formed.

12 Claims, 5 Drawing Sheets

(56) References Cited

U.S. PATENT DOCUMENTS

| | | | |
|---|---|---|---|
| 4,963,151 A | 10/1990 | Ducheyne et al. | |
| 5,217,794 A | 6/1993 | Schrenk | |
| 5,305,143 A | 4/1994 | Taga et al. | |
| 5,401,587 A | 3/1995 | Motohiro et al. | |
| 5,783,120 A | 7/1998 | Ouderkirk et al. | |
| 6,057,961 A * | 5/2000 | Allen et al. | 359/489.12 |
| 6,111,696 A * | 8/2000 | Allen et al. | 359/487.02 |
| 6,256,146 B1 * | 7/2001 | Merrill et al. | 359/487.02 |
| 7,057,816 B1 * | 6/2006 | Allen et al. | 359/489.13 |
| 7,356,229 B2 * | 4/2008 | Ouderkirk et al. | 385/115 |
| 7,406,239 B2 | 7/2008 | Ouderkirk et al. | |
| 2004/0258377 A1 | 12/2004 | Berkey et al. | |
| 2006/0193582 A1 | 8/2006 | Ouderkirk et al. | |
| 2007/0253060 A1 | 11/2007 | Yoshioka et al. | |

FOREIGN PATENT DOCUMENTS

| | | | |
|---|---|---|---|
| JP | 10-130946 A | 5/1998 | |
| JP | 2006-091369 A | 4/2006 | |
| JP | 2006-126313 A | 5/2006 | |
| JP | 2006-215485 A | 8/2006 | |
| JP | 2006-215486 A | 8/2006 | |

OTHER PUBLICATIONS

Chinese Office Action dated Feb. 23, 2011, issued in corresponding Chinese Patent Application No. 200880002991.X.

Korean Office Action dated Jun. 17, 2011, issued in corresponding Korean Patent Application No. 10-2009-7010095.

Japanese Office Action dated Feb. 10, 2012, issued in corresponding Japanese Patent Application No. 2008-146424 (w/ partial English translation).

Taiwanese Office Action dated Mar. 28, 2013, issued in corresponding Taiwanese Patent Application 097121709, w/partial English translation.

* cited by examiner

POLARIZING FIBER, POLARIZER, POLARIZING PLATE, LAMINATED OPTICAL FILM, AND IMAGE DISPLAY

CROSS-REFERENCE TO RELATED APPLICATIONS

This application is a divisional of U.S. application Ser. No. 12/523,223, filed on Aug. 11, 2009, now abandoned, which is a 371 of International Application No. PCT/JP2008/060262 filed on Jun. 4, 2008 which is based upon and claims the benefit of priority from the prior Japanese Patent Application No. 2007-161408, filed on Jun. 19, 2007, the entire contents of which are incorporated herein by reference.

TECHNICAL FIELD

The present invention relates to a polarizing fiber, a polarizer, a polarizing plate, a laminated optical film, and an image display. More specifically, the present invention relates to a polarizing fiber preferably used to produce a polarizer wherein unevenness of the transmittance is small and cracks are less generated.

BACKGROUND ART

In general, liquid crystal displays have a liquid crystal panel wherein a laminated optical film comprising a polarizer is adhered onto each of two surfaces of a liquid crystal cell, and the liquid crystal cell is made of a liquid crystal material sandwiched between two glass plates. As this polarizer, there is generally used a drawn film obtained by dyeing a polyvinyl alcohol (PVA) based film with iodine or the like, and then drawing the film uniaxially. This polarizer is a polarizer exhibiting absorption dichroism.

As the display performance of liquid crystal displays has been improved in recent years, polarizers which have a higher transmittance and a higher polarization degree have been desired. In order to obtain a polarizer high in transmittance, a film which is made of a polyvinyl alcohol based material having a high polymerization degree is used. Moreover, in order to obtain a polarizer high in polarization degree, a film which is drawn at a higher draw ratio is used (see, for example, Patent Document 1).

However, it is known that a break called crack is easily generated in any films drawn at a high draw ratio. This crack is generated in parallel to the direction in which the film is drawn. It is guessed that this crack is generated since the film-drawn direction and the direction perpendicular thereto are different from each other in thermal shrinkage behavior or the linear expansion coefficient. The crack is more easily generated in a film drawn at a higher draw ratio. When a polarizer wherein a crack is generated is used, the display performance of the liquid crystal display is damaged.

On the other hand, a large-area polarizer that can be used in a large-sized liquid crystal televisional image-receiver has been desired as the size of liquid crystal televisional image-receivers has been becoming large. This is because it is preferred that the polarizer used in a liquid crystal display or the like be seamless. However, about large-area drawn films, the probability of the generation of a crack therein becomes high when the films are produced. Furthermore, in order to produce large-area drawn films, a large-scale drawing facility is required. In order to arrange this drawing facility, a large facility investment is required.

Thus, for example, a technique disclosed in Patent Document 2 is known as a method that neither causes the generation of a crack nor requires any large drawing facility. Specifically, Patent Document 2 proposes a technique of using a polarizing fiber to form a polarizing woven cloth, and coating this polarizing woven cloth with a transparent resin to form a polarizing filter. According to this technique, no drawn film is used; thus, the filter is not cracked in light of the structure thereof, and further no large-scale drawing facility is required.

However, the polarizing filter described in Patent Document 2 is not developed for being used in a liquid crystal display. For this reason, in the polarizing filter, the presence distribution of its polarizing fibers varies, so that the unevenness of transmitted light emerges remarkably. Moreover, in the polarizing filter, light is refracted or reflected on the interfaces between the polarizing fibers and the transparent resin in accordance with the difference between the refractive indexes of the polarizing fibers and that of the coating transparent resin. For this polarizing filter, the transmittance and the polarization degree thereof are not sufficient for liquid crystal displays. Accordingly, the polarizing filter described in Patent Document 2 cannot be used as it is for a liquid crystal display.

Further, as the method for dyeing a polarizing fiber, a method of kneading a resin and a dye, and then spinning the kneaded product, or a method of forming pellets (chips) dyed with a dye in advance and then blending the pellets when a fiber spinning is made is known (see, for example, Patent Documents 3 and 4). However, in any one of the methods, it is necessary for adjusting the color tone of a polarizer to incorporate plural dyes to a polarizing fiber therefor during producing the fiber. Therefore, according to the methods, after the production of a polarizing fiber, the color tone thereof cannot be adjusted.

Thus, proposed is a technique of using a polarizing fiber and a birefringent fiber together, thereby overcoming the unevenness of the transmittance, preventing the refraction or reflection of light on the interface between the polarizing fiber and a transparent resin, and making it possible to adjust the color tone of the polarizing fiber after the fiber is made into a fiber spinning (see, for example, Patent Document 5).

Patent Document 1: JP-A-8-190015
Patent Document 2: JP-A-6-130223
Patent Document 3: JP-A-10-130946
Patent Document 4: JP-A-10-170720
Patent Document 5: JP-A-2006-126313

DISCLOSURE OF THE INVENTION

However, when the birefringent fiber in the technique of Patent Document 5 is formed into a thickness (diameter) giving a good scattering efficiency, the strength of the birefringent fiber becomes insufficient. It is therefore difficult to produce practically a birefringent fiber having a thickness giving a good scattering efficiency. Also, in the technique of Patent Document 5, it is also difficult to arrange the polarizing fiber and the birefringent fiber evenly in parallel to the longitudinal direction.

A first object of the present invention is to provide a polarizing fiber that makes it possible to form easily a birefringent fiber having a thickness (diameter) giving a good scattering efficiency and further exhibits the same effect as a case where a polarizing fiber and a birefringent fiber are evenly arranged in parallel to the longitudinal direction thereof.

A second object of the present invention is to provide a polarizer, a polarizing plate, a laminated optical film, and an image display in each of which the above-mentioned polarizing fiber is used.

A polarizing fiber of the present invention has an absorption axis in the longitudinal direction wherein the cross sectional form perpendicular to the longitudinal direction thereof has a sea-island structure, and the cross sectional form is continuously made up in the longitudinal direction. Also, a resin (sea component) that constitutes the sea region of the sea-island structure comprises a dichroic dye, and a resin (island component) that constitutes the island regions of the sea-island structure is a transparent resin.

In the polarizing fiber, the cross section perpendicular to the longitudinal direction has a sea-island structure, and further the fiber has an absorption axis in the longitudinal direction along which the cross sectional form is continuously formed. The polarizing fiber of this structure can easily be formed by an extrusion molding by using a nozzle for multiple spinning. Additionally, the resin (island component) that constitutes the island regions is a transparent resin. This functions in the same manner as conventional birefringent fibers. The island regions are formed in the sea region (polarizing resin). Therefore, the polarizing fiber can be made finer as compared with a case where a birefringent fiber is solely formed as in the prior art. Accordingly, a polarizing fiber having a cross sectional diameter giving a good scattering efficiency is easily obtained.

The phrase "the cross section has a sea-island structure" refers to a structure that a form of a cross section comprises a sea region made of the same component, the region being compared to a sea, and island regions made of a component different from the sea component, the regions being compared to islands, wherein the island regions are surrounded by the sea region and further the island regions do not contact each other.

Furthermore, the polarizing fiber of the present invention has an absorption axis in the longitudinal direction. When the polarizing fiber is arranged or laminated in parallel to the longitudinal direction, a polarizer can easily be formed. Moreover, the polarizing fiber of the present invention envelops therein a transparent resin (island component) functioning as a birefringent fiber. Therefore, the ratio between the region (sea component) corresponding to a conventional polarizing fiber, and the regions (island component) corresponding to a conventional birefringent fiber is constant at all times. Accordingly, in the polarizing fiber of the present invention, the polarizing-fiber-corresponding region and the birefringent-fiber-corresponding regions can be uniformly arranged in parallel to the longitudinal direction.

In the polarizing fiber of the present invention, the resin (sea component) that constitutes the sea region of the sea-island structure comprises a dichroic dye, and the resin (island component) that constitutes the island regions of the sea-island structure is a transparent resin. Accordingly, polarized light parallel to the longitudinal direction is absorbed in the sea region. On the other hand, polarized light that has reached the island regions are reflected, diffused, or scattered on/in the island regions. The optical path of the polarized light which has been changed by the reflection, diffusion, or scattering is returned to the sea region again. As a result, the polarized light parallel to the longitudinal direction remains in the polarizing fiber for a long period. Thus, the probability that the polarized light parallel to the longitudinal direction is absorbed in the polarizing fiber becomes higher as compared with a case where a polarizing fiber has no island regions. On the other hand, the polarized light in the direction perpendicular to the longitudinal direction is neither absorbed in the sea region nor the island regions, so as to go straight and permeate therethrough. Accordingly, the polarizing fiber of the present invention has a greater polarizing performance than conventional polarizing fibers having no island regions.

In the polarizing fiber of the present invention, the cross sectional form is continuously made up in the longitudinal direction. Therefore, the polarizing fiber has no difference between optical properties (has uniform optical properties) at all positions along the longitudinal direction in the same fiber. Accordingly, a polarizer having uniform optical properties can be produced by arranging or laminating the polarizing fiber in parallel to the longitudinal direction.

The polarizing fiber of the present invention makes it possible to form a birefringent fiber having a thickness (diameter) giving a good scattering efficiency, and further exhibits the same effect as a case where a polarizing fiber and a birefringent fiber are evenly arranged in parallel to the longitudinal direction thereof. The use of the polarizing fiber of the present invention makes it possible to produce a polarizer wherein the polarization degree is excellent, the unevenness of the transmittance is small, and cracks are less generated.

In the preferable polarizing fiber of the present invention, when the refractive index of the island component in the direction perpendicular to the longitudinal direction is represented by $n_{i1}$ and the refractive index of the sea component in the direction perpendicular to the longitudinal direction is represented by $n_{s1}$, the difference between the refractive indexes, $\Delta n_1 = |n_{s1} - n_{i1}|$, is 0.02 or less, and when the refractive index of the island component in the longitudinal direction is represented by $n_{i2}$ and the refractive index of the sea component in the longitudinal direction is represented by $n_{s2}$, the difference between the refractive indexes, $\Delta n_2 = |n_{s2} - n_{i2}|$, is 0.03 or more and 0.05 or less.

In the preferable polarizing fiber, the difference $\Delta n_1$ between the refractive indexes in the direction perpendicular to the longitudinal direction is 0.02 or less. Therefore, in the polarizing fiber, polarized light in the direction perpendicular to the longitudinal direction can be further restrained from being reflected, diffused, or scattered on/in the interfaces between the sea component and the island component of the polarizing fiber. Thus, the polarized light in the direction perpendicular to the longitudinal direction goes straight and permeates therethrough without being absorbed in the sea component.

On the other hand, in the preferable polarizing fiber, the difference $\Delta n_2$ between the refractive indexes in the longitudinal direction is 0.03 or more. Therefore, in the polarizing fiber, polarized light parallel to the longitudinal direction is easily reflected, diffused, or scattered on/in the interfaces between the sea component and the island component of the polarizing fiber. Thus, the polarizing fiber of the present invention has still larger polarizing performances than conventional polarizing fibers having no island regions.

As another preferable polarizing fiber of the present invention, the number of the island regions is 2 or more, and further the long diameter of each of the island regions is from 0.1 to 8.0 μm.

In another preferable polarizing fiber, the number of the island regions (hereinafter referred to as the island number) is 2 or more; therefore, polarized light that permeates through the polarizing fiber and is parallel to the longitudinal direction easily undergoes multiple reflection, multiple diffusion or multiple scattering. Thus, the probability that the polarized light parallel to the longitudinal direction is absorbed in the sea component becomes still higher.

When the long diameter of the islands is shorter than about 1/10 of the wavelength of the light, the polarized light is hardly scattered. In another preferable embodiment, the long diameter of the island regions is 0.1 μm or more (this is longer than 1/10 of visible ray wavelengths); therefore, the polarizing fiber causes polarized light to be scattered.

On the other hand, if the long diameter of the islands is too large, the island number per filament of the polarizing fiber becomes relatively small, so that polarized light hardly undergoes multiple reflection, multiple diffusion or multiple scattering. In this case, the presence distribution of the islands becomes sparse so that the uneven of transmittance easily generates. In another preferred embodiment, the long diameter of each of the islands is 8.0 μm or less; thus, the long diameters of the islands are not too large. As a result, the above-mentioned bad results can be restrained.

In another preferable polarizing fiber of the present invention, the above resin that constitutes the sea region is polyvinyl alcohol, or ethylene vinyl alcohol copolymer.

The polyvinyl alcohol or the ethylene vinyl alcohol copolymer is actually used as the raw material of a polarizer, and is versatile and inexpensive.

In another aspect of the present invention, a polarizer is provided.

As the polarizer of the present invention, the above polarizing fiber is arranged or laminated in parallel to the longitudinal direction, and the polarizing fiber is further enveloped in a transparent isotropic material to be sheet form.

In the preferable polarizer of the present invention, when the refractive index of the isotropic material is represented by $n_m$ and the refractive index of the sea component in the direction perpendicular to the longitudinal direction is represented by $n_{s1}$, the difference between the refractive indexes, $\Delta n_3 = |n_{s1} - n_m|$, is 0.02 or less.

In the preferable polarizer, the difference $\Delta n_3$ between the refractive index of the sea component in the direction perpendicular to the longitudinal direction and that of the isotropic material is 0.02 or less; therefore, polarized light in the direction perpendicular to the longitudinal direction can be restrained from being reflected, diffused, or scattered on the interface between the sea component and the isotropic material. Thus, the polarizer becomes high in transmittance, and easily transmits polarized light in the direction perpendicular to the longitudinal direction.

In another aspect of the present invention, a polarizing plate is provided.

The polarizing plate of the present invention has a transparent protective film on at least one surface of the polarizer.

In another aspect of the present invention, a laminated optical film is provided.

The laminated optical film of the present invention has the above polarizer or the above polarizing plate.

In another aspect of the present invention, an image display is provided.

The image display of the present invention has at least one selected from the group consisting of the above polarizer, the above polarizing plate, and the above laminated optical film.

BEST MODE FOR CARRYING OUT THE INVENTION

With reference to FIGS. 1 to 6, the following will describe embodiments of a polarizing fiber, a polarizer, a polarizing plate, a laminated optical film, and an image display wherein the present invention is embodied.

[Polarizing Fiber]

Figure 1:
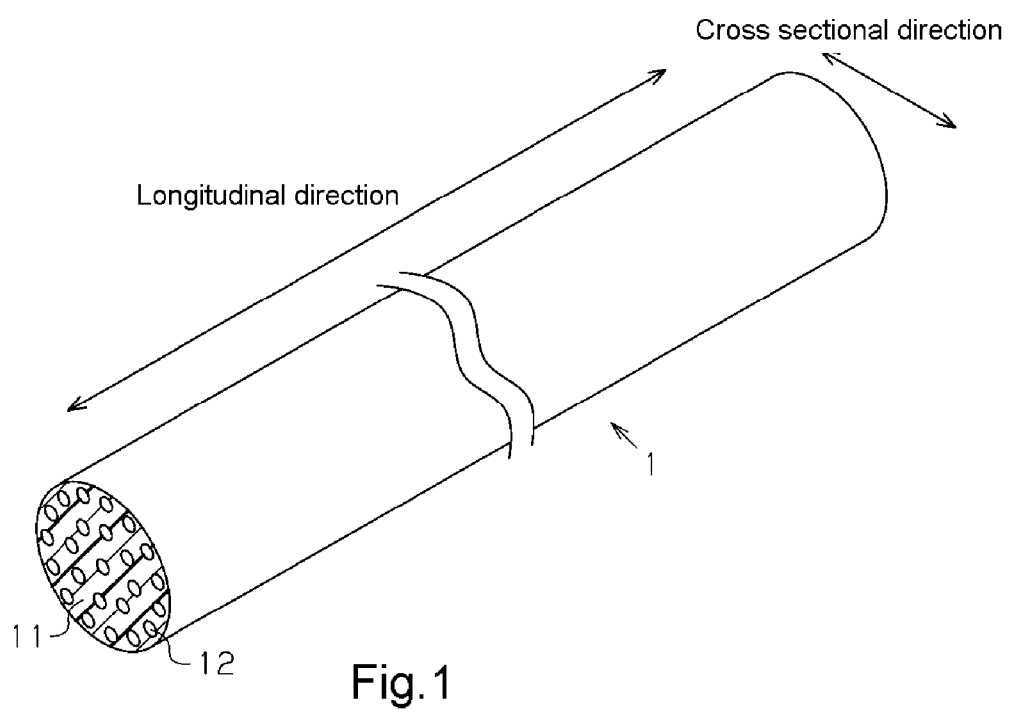
FIG. 1 is a perspective view illustrating a polarizing fiber according to an embodiment.

As illustrated in FIG. 1, in a polarizing fiber 1 according to the present embodiment, its cross section perpendicular to the longitudinal direction thereof has a sea-island structure, and further the cross sectional form is continuously made up in the longitudinal direction. A resin (sea component) that constitutes the sea region of the sea-island structure comprises a dichroic dye. The sea region 11 comprising the dichroic dye has an absorption axis in the longitudinal direction.

A resin (island component) that constitutes the island regions 12 of the sea-island structure is a transparent resin. The refractive index of the sea component in the longitudinal direction is largely different from that of the island component in the longitudinal direction. On the other hand, the refractive index of the sea component in the direction perpendicular to the longitudinal direction is equal to or approximate to that of the island component in the direction perpendicular to the longitudinal direction (the refractive index of the polarizing fiber 1 in the cross sectional direction).

The difference $\Delta n_2$ between the refractive index of the sea component in the longitudinal direction and the refractive index of the island component in the longitudinal direction ($\Delta n_2 = |n_{s2} - n_{i2}|$) is preferably 0.03 or more and 0.05 or less and more preferably 0.035 or more and 0.045 or less.

The symbol "$n_{s2}$" represents the refractive index of the sea component in the longitudinal direction and the symbol "$n_{i2}$" represents the refractive index of the island component in the longitudinal direction.

The difference $\Delta n_1$ between the refractive index of the sea component in the direction perpendicular to the longitudinal direction and the refractive index of the island component in the direction perpendicular to the longitudinal direction ($\Delta n_1 = |n_{s1} - n_{i1}|$) is preferably 0.02 or less and more preferably 0.01 or less.

The symbol "$n_{s1}$" represents the refractive index of the sea component in the direction perpendicular to the longitudinal direction and the symbol "$n_{i1}$" represents the refractive index of the island component in the direction perpendicular to the longitudinal direction.

The resin that constitutes the sea component is not limited in the kind thereof as far as the resin has light transmissivity in the visible light range, can be made into a fibrous form, and has the property that a dichroic dye can be dispersed. As these resins, for example, a polyvinyl alcohol and a derivative thereof used as a polarizer conventionally may be cited. As the derivative of the polyvinyl alcohol, polyvinyl formal, polyvinyl acetal, and the like may be cited. As the derivative of the polyvinyl alcohol, olefin such as ethylene, propylene; unsaturated carboxylic acid such as acrylic acid, methacrylic acid, crotonic acid; alkyl ester of the unsaturated carboxylic acid; polyvinyl alcohol modified by acrylamide may be cited. As the derivative of the polyvinyl alcohol, polyvinyl pyrolidone based resin, amylose based resin, and the like may be cited. Among them, the resin that constitutes the sea component is preferably the polyvinyl alcohol. The resin is preferably a copolymer made from ethylene and vinyl alcohol from the viewpoint of melt spinning.

When the sea-island structure is formed by extrusion molding, it is preferable that the resin that constitutes the sea component is close to the resin that constitutes the island component in melt viscosity and melt flow index.

As the above dichroic dye, it is not particularly limited, but the compound which can absorb a certain wavelength in the visible light region is preferable.

In accordance with classification according to chemical structure, as the dichroic dye, an azo based pigment, an anthraquinone based pigment, a perylene based pigment, an indanthrone based pigment, an imidazole based pigment, an indigoid based pigment, an oxazine based pigment, a phthalocyanine based pigment, a triphenylmethane based pigment, a pyrazolone based pigment, a stilbene based pigment, a diphenylmethane based pigment, a naphthoquinone based pigment, a methocyanine based pigment, a quinophthalone based pigment, a xanthene based pigment, an alizarin based pigment, an acridine based pigment, a quinonimine based pigment, a thiazole based pigment, a methine based pigment, a nitro based pigment, a nitroso based pigment, and the like may be cited.

These dichroic dyes may be used singly or in combination of two or more kinds.

Next, with reference to FIG. 2, the following will describe the behavior of light entered to the polarizing fiber.

The light entered into the polarizing fiber 1 can be considered to be light separated vectorially into a linearly polarized light 21 parallel to the cross sectional direction of the polarizing fiber 1 and a linearly polarized light 22 parallel to the longitudinal direction of the polarizing fiber 1.

Figure 2A:
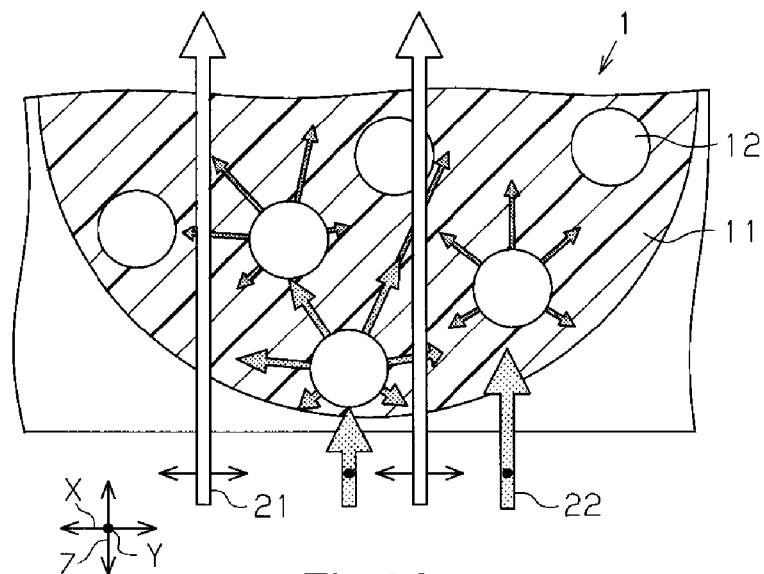
FIG. 2A is a view of a partial cross section of the polarizing fiber, which is a plane perpendicular to the longitudinal direction of the fiber.
Figure 2B:
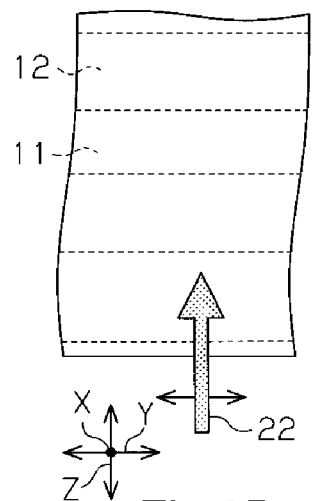
FIG. 2B is a partial side view of the polarizing fiber.

In FIGS. 2A and 2B, the incident light is illustrated such that the advancing direction of the incident light is defined as Z direction, the direction parallel to the cross sectional direction of the polarizing fiber 1 is defined as X direction, and the direction parallel to the longitudinal direction of the polarizing fiber 1 is defined as Y direction. Near the root of an arrow representing each of the linearly polarized light 21 and 22, small arrows representing the direction of the polarized light are drawn.

The linearly polarized light 21 (referred to as the X polarized light) parallel to the cross sectional direction of the polarizing fiber 1 is a polarized light in the direction perpendicular to the absorption axis direction of the sea region 11. Accordingly, the X polarized light permeates through the polarizing fiber 1 without being absorbed in the sea region 11. As described above, the refractive index of the resin that constitutes the sea component in the cross sectional direction (the X direction) is substantially equal to that of the resin that constitutes the island component in the cross sectional direction (the X direction). Therefore, in the interfaces between the sea region 11 and the island regions 12 also, the X polarized light permeates through the polarizing fiber 1 without being reflected, diffused, or scattered. Furthermore, the island regions 12 are made of the transparent resin; therefore, the X polarized light permeates through the polarizing fiber 1 without causing any especial problem. Thus, the X polarized light permeates into the polarizing fiber 1 without receiving any effect substantially.

On the other hand, the linearly polarized light 22 (referred to as the Y polarized light) parallel to the longitudinal direction of the polarizing fiber 1 is a polarized light in the direction parallel to the absorption axis direction of the sea region 11. Accordingly, almost all of the Y polarized light is absorbed in the sea region 11. As described above, the refractive index of the resin that constitutes the sea component in the longitudinal direction (the Y direction) is largely different from the refractive index of the resin that constitutes the island component in the longitudinal direction (the Y direction). In the interfaces between the sea region 11 and the island regions 12, the Y polarized light is reflected, diffused, or scattered. Accordingly, the optical path of the Y polarized light is changed every time when the Y polarized light passes each interface of the sea region 11 and the island regions 12. Thus, the Y polarized light passes through the long optical path in the polarizing fiber 1, and almost all of the Y polarized light is absorbed in the sea region 11.

As the fiber corresponding to the island component in the present invention, a birefringent fiber is conventionally used. However, in the present invention, birefringence is not necessarily essential. As described above, in the polarizing fiber of the present invention, the refractive index of the sea component in the longitudinal direction is largely different from that of the island component in the same direction, and further the refractive index of the sea component in the direction perpendicular to the longitudinal direction is equal to or approximate to that of the island component in the same direction. Thus, the polarizing fiber can selectively transmit a specific linearly polarized light.

Accordingly, in the present specification, the transparent resin that constitutes the island component is referred to as the "refractive index differed component". When the refractive index differed component is made into a fibrous form, the fiber is referred to as the "refractive index differed fiber". However, when it is formed as a different fiber in the same manner as in the prior art, the fiber is referred to as a birefringent fiber as ever in order to avoid confusion.

The island number (the number of the island regions) per single polarizing fiber is preferably 2 or more, more preferably 4 or more, and particularly preferably 6 or more. The upper limit of the island number is not particularly limited, so that the number may be set in accordance with the thickness of the polarizing fiber or the island regions. The island number is, for example, 100 or less.

The long diameter of the island regions is preferably from 0.1 to 8.0 µm and more preferably from 0.5 to 7.5 µm.

The long diameter of the island regions means the following: when the cross sectional form of the island regions is circular, the diameter thereof; and when the cross sectional form of the island regions is noncircular (for example, elliptic), the longest diameter thereof.

In the present specification, the description of "A to B" means "A or more and B or less".

The polarizing fiber 1 according to the above embodiment may be changed as follows.

In FIG. 1, the cross sectional form of the polarizing fiber 1, which is a plane perpendicular to the longitudinal direction of the fiber, is circular. However, the form is not limited thereto, and may be, for example, elliptic.

Also, in FIG. 1, the cross sectional form of the island regions 12, which is a plane perpendicular to the longitudinal direction, is circular. However, the form is not limited thereto, and may be, for example, elliptic.

In FIG. 1, the island regions 12 in the cross section of the polarizing fiber 1 are arranged approximately concentric from. However, the island regions 12 may be arranged in a different form. For example, the island regions 12 may be arranged to be approximately evenly dispersed, or may be arranged to be dispersed at random. However, in order to cause multiple reflection, multiple diffusion, or multiple scattering easily, it is preferred that the island regions 12 are arranged to be dispersed in an approximately even form, such as an approximately concentric form.

[Polarizer]

Figure 3:
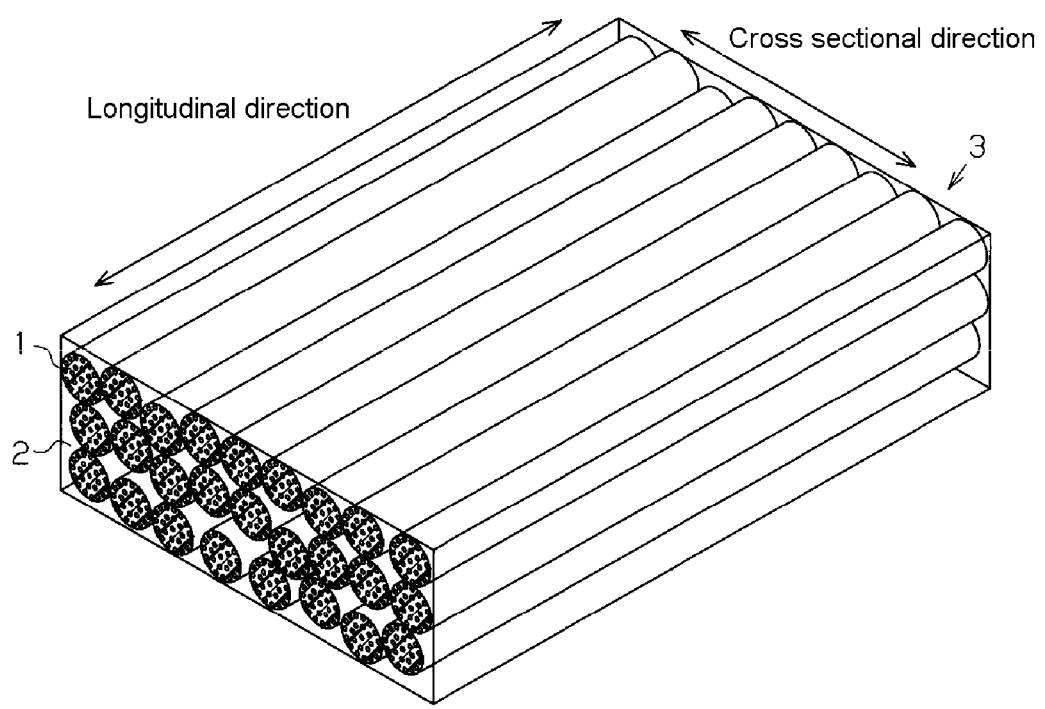
FIG. 3 is a perspective view illustrating a polarizer according to an embodiment.

As illustrated in FIG. 3, a polarizer 3 of the present invention is a sheet having polarizing fibers 1. The polarizer 3 is produced by using the polarizing fiber 1 illustrated FIG. 1. In the polarizer 3 of the present embodiment, the polarizing fibers 1 are arranged or laminated in parallel to the longitudinal direction of the polarizer 3, and the polarizing fibers 1 are enveloped in a transparent isotropic material 2. The polarizer is a sheet having the optical property of transmitting a certain linearly polarized light from a natural light or a polarized light.

In the polarizer 3 of the present embodiment, it is preferable that the plural polarizing fibers 1 are arranged or laminated in parallel to the longitudinal direction without generating any gap. For example, when the two or more polarizing fibers 1 are laminated in the thickness direction of the polarizer 3, it is preferable that adjacent ones out of the polarizing fibers 1 contact each other. By arranging the polarizing fibers 1 without generating any gap in this way, a polarizer 3 excellent in polarization property can be obtained.

In the present embodiment, the isotropic material 2 and the raw material of the sea region 11 are selected to set the difference between the refractive indexes, $\Delta n_3 = |n_{s1} - n_m|$, to 0.02 or less. Here, the symbol "$n_m$" represents the refractive index of the above isotropic material 2, and the symbol "$n_{s1}$" represents the refractive index of the sea component in the polarizing fibers 1 in the direction perpendicular to the longitudinal direction.

By selecting the raw material to set the $\Delta n_3$ to 0.02 or less, the polarized light in the direction perpendicular to the longitudinal direction can be restrained from being reflected, diffused, or scattered on the interface between the sea region 11 and the isotropic material 2. As a result, the polarizer 3, which has a high transmittance and easily transmit the polarized light in the direction perpendicular to the longitudinal direction can be provided. In principle, the $\Delta n_3$ is preferably zero. However, a case where the $\Delta n_3$ does not easily become zero in fact may be caused; thus, a combination where the $\Delta n_3$ is as close to zero as possible is investigated while other requirements are considered.

When the number of the polarizing fibers 1 is increased in the polarizer 3, the transmittance of the polarizer 3 is declined. On the other hand, when the number of the polarizing fibers 1 is decreased in the polarizer 3, the absorptance of the polarized light parallel to the longitudinal direction is declined so that the polarization performance of the polarizer 3 deteriorates. Accordingly, the number of the polarizing fibers 1 in the polarizer 3 is determined in accordance with the balance between required transmittance and polarization performance. The balance is varied also in accordance with the concentration of the dichroic dye in the sea region, the number of the islands per single polarizing fiber, the long diameter of the islands, the form of the islands, and others.

The polarizer 3 is produced by enveloping the polarizing fibers 1 in the isotropic material 2 without generating any gap. When the polarizer 3 is produced, it is not preferable that air bubbles are put into between the polarizing fibers 1 and the isotropic material 2, since the gap is generated. When the air bubbles are put thereinto, the bubbles become isotropic scattering-points independent of polarized light. Thus, the polarization performance of the polarizer 3 deteriorates. In order to prevent the air bubbles from being put thereinto, the used isotropic material 2 is preferably a material in low viscosity.

The total thickness of the polarizer 3 of the present invention is not particularly limited, and is preferably from about 20 to 500 μm. If the thickness of the polarizer 3 is too thin, the number of the polarizing fibers 1 that can be enveloped becomes relatively small so that the polarization performance of the polarizer 3 becomes insufficient. If the thickness of the polarizer 3 is too thick, the handleability is poor and further there are caused such as a problem that at the time of the production, air bubbles are easily put thereinto.

The polarizer 3 according to the embodiment may be changed as follows.

The polarizer 3 may be produced by using the polarizing fibers 1 and wefts to form a woven cloth, and enveloping this woven cloth in the isotropic material 2. In this case also, it is preferred that the woven cloth is enveloped in the isotropic material 2 without generating any gap in the same manner as described above. Usually, the polarizer 3 is produced in the following order: the step of forming the woven cloth on ahead, and the step of enveloping this woven cloth in the isotropic material 2. According to this step-order, the polarizer 3 can be efficiently produced. However, the parallel property of the polarizing fibers 1 may be somewhat deteriorated since the woven cloth is formed by weaving.

The material of the wefts may be an arbitrary transparent resin. The wefts are preferably threads made of a transparent resin having a refractive index approximately equal to that of the isotropic material 2. In this case, the difference between the refractive index of the wefts and that of the isotropic material 2 is preferably 0.02 or less, more preferably 0.01 or less, and particular preferably zero. To restrain deterioration in the polarization property, it is preferable that the wefts be as thin as possible. However, if the strength of the polarizing fibers 1 is largely different from that of the wefts, the woven cloth is not easily formed. Therefore, it is preferable that the long diameter of the wefts is from about 1 to 30 μm. The cross sectional form of the wefts is not particularly limited, and is preferably elliptic from the viewpoint of easiness of the formation thereof. The weaving manner for the woven cloth may be plain weave, satin weave, or a manner in which the polarizing fibers 1 are bunched and then the bunch is woven. When the woven cloth formed in such a manner is used, deterioration in the polarization property of the polarizer 3 can be prevented.

The polarizer 3 may be produced by producing several species of polarizing fibers 1 wherein dichroic dyes comprised in their sea regions 11 are different from each other, and then combining these polarizing fibers 1 with each other. By the production in this way, the absorption wavelength of polarized light can easily be adjusted and the color tone of polarized light transmitted through the polarizer 3 can easily be adjusted. By the use of the polarizing fibers 1 comprising, for example, dichroic dyes described below in their sea regions 11, a polarizer 3 can be produced wherein the absorptance of polarized light is approximately constant in the whole of the visible light range. Firstly, the polarizing fibers 1 comprising a red (R) based dye, a green (G) based dye, and a blue (B) based dye respectively as the dichroic dye in their sea components are produced. Next, the individual polarizing fibers 1 are combined with each other to make the absorptance of polarized light constant in the whole of the visible light range, thereby producing the polarizer 3. In the case of using, as the red (R) based, green (G) based and blue (B) based dyes, for example, Congo Red (manufactured by Kishida Chemical Co., Ltd.), Direct Green 85 (manufactured by Mitsubishi Chemical Corp.), and GREY-B (manufactured by Clariant (Japan) K.K.), respectively, it is preferable to combine the individual polarizing fibers 1 with each other to set the ratio by weight between the individual dyes R:G:B=30 to 50:40 to 60:10 to 30.

[Polarizing Plate]

Figure 4:
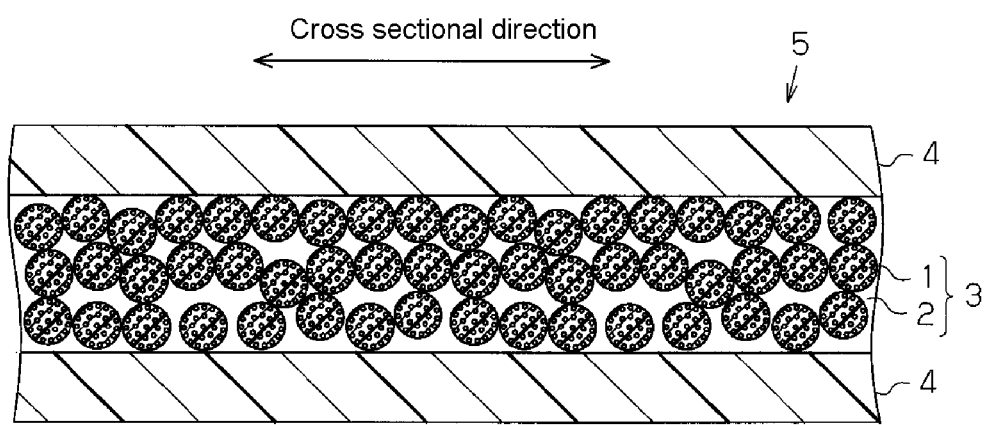
FIG. 4 is a view of a partial cross section illustrating a polarizing plate according to an embodiment.

As illustrated in FIG. 4, the polarizing plate 5 according to the present embodiment has a structure such that the protective films 4 are laminated on both surfaces of the polarizer 3. As to the polarizer 3, the polarizing fibers 1 are enveloped in a transparent isotropic material 2.

The protective film 4 used in the above polarizing plate 5 is preferably a transparent film. Furthermore, the protective film 4 is preferably a film excellent in mechanical strength, thermal stability, water blocking property, isotropy, and others. As the protective film 4, for example, a film made of polyethylene based polymer such as polyethylene terephthalate, polyethylene naphthalate; cellulose based polymer such as diacetylcellulose, triacetylcellulose; acrylic based polymer such as polymethyl methacrylate; styrene based polymer such as polystyrene, acrylonitrile-styrene copolymer (AS); polycarbonate based polymer may be cited. Also, as the above protective layer 4, a film made of a polyolefin based polymer such as polyethylene, polypropylene, ethylene-propylene copolymer having a cyclo based or norbornene structure; vinyl chloride based polymer; amide based polymer such as nylon, aromatic polyamide; imide based polymer; sulfone based polymer; polyethersulfone based polymer; polyetheretherketone based polymer; polyphenylene sulfide based polymer; vinyl alcohol based polymer; vinylidene chloride based polymer; vinyl butyral based polymer; acrylate based polymer; polyoxymethylene based polymer; epoxy based polymer; silicon based polymer may be cited.

The protective film 4 is preferably a film made of a cellulose based polymer, such as triacetylcellulose, from the viewpoint of polarization property, endurance, and others. The protective film 4 is in particular preferably a triacetylcellulose film.

The thickness of the protective film 4 may be set in arbitrarily. The thickness of the protective film is typically from about 1 to 500 µm and preferably from 5 to 200 µm from the viewpoint of strength, handleability, and workability for producing a thin film.

The protective film 4 is preferably a colorless film as far as possible. As the protective film 4, for example, a film having a retardation value in the thickness direction of from −90 nm to +75 nm may be cited. Here, the retardation value "Rth (590)" in the thickness direction may be calculated from the expression of $Rth(590)=(nx-nz) \times d$. Here, "590" represents a measurement wavelength, "nx" represents a refractive index of a slow axis direction of the film in the plane, "nz" represents a refractive index of the film in the thickness direction, and "d" represents a thickness of the film.

The retardation value in the thickness direction of the protective film 4 is more preferably from −80 nm to +60 nm and particularly preferably from −70 nm to +45 nm.

The polarizing plate 5 according to the above embodiment may be changed as follows.

In FIG. 4, the polarizing plate 5 is formed in such a manner that the protective films 4 are laminated on both surfaces of the polarizer 3. However, the polarizing plate 5 is not limited to this structure. For example, a protective film 4 may be laminated on only one of the surfaces of the polarizer 3. In particular, in the case where a polarizing plate 5 is produced by laminating another film having some other optical property, no protective film may be laminated on the other surface of the polarizer 3. When the protective film 4 is disposed on only one of the surfaces of the polarizer 3 (in other words, another protective film 4 is not disposed on the other surface of the polarizer 3) in this way, a relatively thin polarizing plate 5 can be provided.

[Laminated Optical Film]

Figure 5:
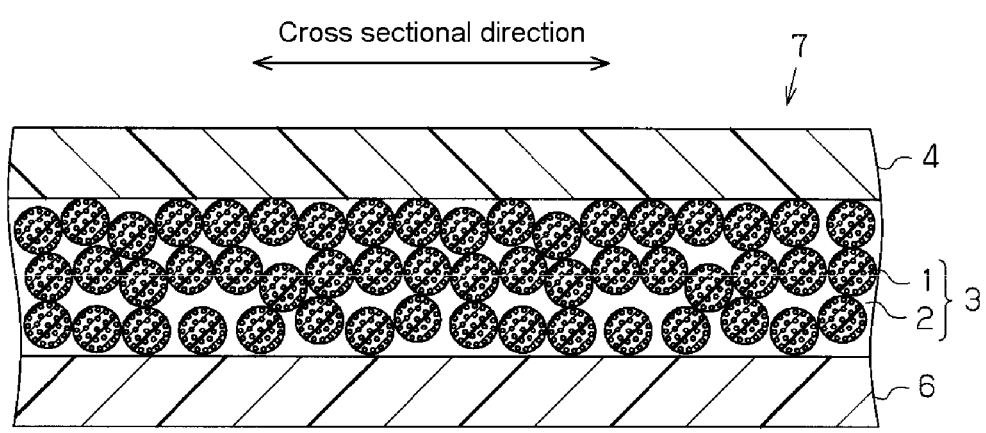
FIG. 5 is a view of a partial cross section illustrating a laminated optical film according to an embodiment.

As illustrated in FIG. 5, a laminated optical film 7 of a present embodiment has a structure such that the protective layer 4 is laminated on only one surface of the polarizer 3 and the optical film 6 is laminated on the other surface of the polarizer 3.

As to the polarizer 3, the polarizing fibers 1 are enveloped in the isotropic material 2.

The protective film 6 is not particularly limited and arbitrary one may be used according to necessity. As the optical film 6, for example, a retardation film, an optical diffusing layer, and the like may be cited. The optical film 6 may be a laminate in which plural of same or different films/layers are combined.

[Image Display]

The image display of the present invention has at least one selected from the group consisting of the polarizer, the polarizing plate, and the laminated optical film. Examples of the image display include representatively a liquid crystal display, an organic EL display, and a plasma display.

Figure 6:
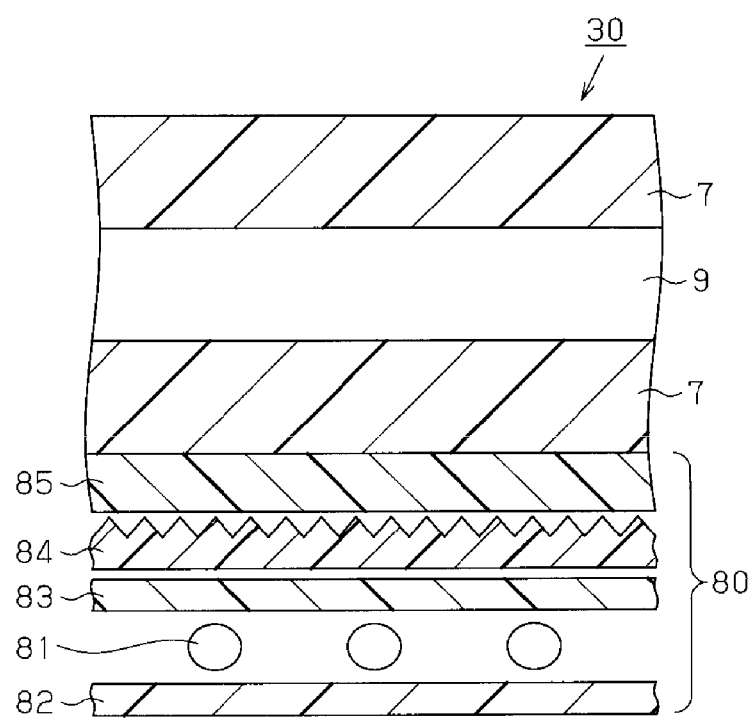
FIG. 6 is a view of a partial cross section illustrating an image display according to an embodiment.

As illustrated in FIG. 6, an image display 30 of the present embodiment is a liquid crystal display. The liquid crystal display is equipped with: a liquid crystal panel wherein a liquid crystal cell 9 is sandwiched between two polarizing plates 7; and a backlight unit 80 disposed on a single side of the liquid crystal panel. The liquid crystal cell 9 has a structure wherein a liquid crystal material is confined into between two glass plates. In the liquid crystal cell 9, the alignment of the liquid crystal material is changed by applying voltage to the glass plates. As a result, the cell selectively transmits light.

The backlight unit 80 is equipped with at least a light source 81, a reflective film 82, a diffuser 83, a prism sheet 84, and a brightness enhancement film 85. The optical members illustrated in FIG. 6, such as the reflective film 82, may be partially omitted or alternated to some other optical member(s) in accordance with the illuminating manner of the liquid crystal display, the driving mode of the liquid crystal cell, or others.

The liquid crystal display (image display) according to the embodiment may be changed as follows.

The liquid crystal display of the above embodiment is a transmission type, wherein light is radiated thereto from the backside of its liquid crystal panel and its display is watched; however, the liquid crystal display may be a reflection type, wherein light is radiated thereto from the viewing side of its liquid crystal panel and its display is watched. Alternatively, the liquid crystal display may be a semi-transmission type, which has both natures of the transmission type and the reflection type.

The backlight unit may be a sidelight type. When the sidelight type is adopted, the backlight unit has at least a light conducting plate and a light reflector besides the above-mentioned structure.

EXAMPLES

Next, the following will describe the present invention more specifically by way of Examples and Comparative Examples. The invention is not limited to these Examples. In the following description, any "%" described as a unit represents percent by weight.

Example 1

Polarizing Fiber A

A nozzle for sea-island composite fiber spinning was used to extrusion-mold an island component material and a sea component material described below, thereby producing a polarizing fiber A.

The used island component material was a propylene-excessive ethylene-propylene copolymer having a melting point of 138° C. and a melt flow index of 25 g/10 min (trade name: "OX1066A", manufactured by Japan Polypropylene Corp.).

The used sea component material was a material obtained by immersing resin pellets of an ethylene-vinyl alcohol copolymer having a melting point of 181° C. and a melt flow index of 12 g/10 min (trade name: "SOANOL (transliterated) DC3212B", manufactured by Nippon Synthetic Chemical Industry Co., Ltd.) in a 2% water solution of a dichroic dye (trade name: "Congo Red", manufactured by Kishida Chemical Co., Ltd.) at 90° C. for 4 hours, washing the pellets with water, and then drying the pellets sufficiently in a vacuum drier.

The used nozzle for sea-island composite fiber spinning was a nozzle for sea-island composite fiber spinning wherein the number of islands was 12 per fiber cross section.

A polarizing fiber was obtained by use of the nozzle for sea-island composite fiber spinning for subjecting the island component material and the sea component material to melt extrusion molding with ratio by weight therebetween being 5:5, and pulling out the resultant at a pulling-out speed of 600 m/min. At this time, the spinning temperature of the island component was set to 270° C., and the spinning temperature of the sea component was set to 230° C. Also, the resultant polarizing fiber had a diameter of 25 μm. This polarizing fiber was drawn 2.5 times in hot water of 70° C. temperature to obtain a polarizing fiber A having a diameter of 15 μm.

As to the polarizing fiber A, the island number is 12 (the island number is 2 or more); thus, polarized light that permeates through the polarizing fiber and is parallel to the longitudinal direction easily undergoes multiple reflection, multiple diffusion, or multiple scattering. Thus, the probability that polarized light is absorbed in the sea component of the polarizing fiber A is still higher.

The diameter of the island regions of this polarizing fiber A was about 1.5 μm. About this polarizing fiber A, the long diameter of the islands is 0.1 μm or more; thus, it is longer than the wavelengths of visible light. Therefore, polarized light may be scattered. Also, about this polarizing fiber A, the long diameter of the islands is 8.0 μm or less; thus, bad results based on the matter that the long diameter is too large are restrained. In other words, in this polarizing fiber A, the island number per single filament of the polarizing fiber becomes relatively small, thereby a bad results such that polarized light does not easily undergo multiple reflection, multiple diffusion, or multiple scattering, or the transmittance easily becomes uneven on the basis of a matter that the presence distribution of the islands becomes thin can be restrained.

The refractive index $n_{s1}$ of the sea component in the direction perpendicular to the longitudinal direction of the above polarizing fiber A was 1.51. The refractive index $n_{s2}$ of the sea component in the longitudinal direction was 1.54.

Further, a fiber comprising only the above island component material was produced for calculating the $\Delta n_1$ and $\Delta n_2$.

Namely, a fiber having a diameter of 100 μm was produced by the above described same method except that only the island component material was spun by using the nozzle for monofilament. The refractive index of the fiber was measured. The refractive index $n_{i1}$ of the island component (fiber) in the direction perpendicular to the longitudinal direction thereof was 1.50. The refractive index $n_{i2}$ of the island component (fiber) in the longitudinal direction was 1.51.

Accordingly, $\Delta n_1 = |n_{s1} - n_{i1}| = |1.51 - 1.50| = 0.01$. The difference $\Delta n_1$ between the refractive indexes in the direction perpendicular to the longitudinal direction is 0.02 or less, so that the polarized light in the direction perpendicular to the longitudinal direction can be restrained from being reflected, diffused, or scattered on/in the interfaces between the sea component and the island component in the polarizing fiber A. As a result, the polarized light in the direction perpendicular to the longitudinal direction goes straight and permeates therethrough without being absorbed in the sea component.

Also, $\Delta n_2 = |n_{s2} - n_{i2}| = |1.54 - 1.51| = 0.03$. The difference $\Delta n_2$ between the refractive indexes in the longitudinal direction is 0.03 or more, so that the polarized light in longitudinal direction is easily reflected, diffused, or scattered on/in the interfaces between the sea component and the island component in the polarizing fiber A. As a result, the polarizing performance of the polarizing fiber A further becomes larger than the polarizing performance of a conventional polarizing fiber, which has no island regions.

Hereinafter, the measurement method of the above diameter and the refractive index is described. In the Examples other than Example 1 and Comparative Examples, the same measurement method was used.

The diameter of the polarizing fiber and the diameter of the island component were measured with a scanning electron microscope (product name: "S-3000N") manufactured by Hitachi Ltd.

Each of the refractive indexes was measured by the Becke line method by using a refractive-index-adjusting solution at normal temperature (25° C.) with wavelength of 545 nm.

Example 2

Polarizing Fiber B

A polarizing fiber B was produced by using the same materials and producing method as in Example 1 except that a dye (trade name: "DIRECT GREEN 85") manufactured by Mitsubishi Chemical Corp. was used as a dichroic dye. The producing method and so on in Example 2 were the same as in Example 1; thus, description thereof is omitted. Moreover, measured results of the diameters, the island number and the refractive indexes were also the same; thus, description thereof is also omitted.

Example 3

Polarizing Fiber C

A nozzle for core-sheath structure fiber spinning was used to extrusion-mold an island component material and a sea component material described below, thereby producing a polarizing fiber C. The nozzle for core-sheath structure fiber spinning is a nozzle for sea-island composite fiber spinning wherein the island number is 1. In the following description, the term "island component" will be used instead of the term "core component", and the term "sea component" will be used instead of the term "sheath component" unless especially necessitated.

The used island component material was a crystalline polypropylene having a melting point of 161° C. and a melt flow index of 26 g/10 min (trade name: "SA03A", manufactured by Japan Polypropylene Corp.).

The used sea component material was the same material as the sea component material described in the Example 1.

A polarizing fiber was obtained by use of the nozzle for core-sheath structure fiber spinning for subjecting the island component material and the sea component material to melt extrusion molding with ratio by weight therebetween being 3:7, and pulling out the resultant at a pulling-out speed of 600 m/min. At this time, the spinning temperature of the island component was set to 230° C., and the spinning temperature of the sea component was set to 230° C. The resultant polarizing fiber had a diameter of 25 μm. This polarizing fiber was drawn 2.5 times in hot water of 70° C. temperature to obtain a polarizing fiber C having a diameter of 15 μm.

The diameter of the island regions of this polarizing fiber C was about 7.0 μm. About this polarizing fiber C, the long diameter of the islands is 0.1 μm or more; thus, it is longer than the wavelengths of visible light. Therefore, polarized light may be scattered. Also, about this polarizing fiber C, the long diameter of the islands is 8.0 μm or less; thus, the above bad results based on the matter that the long diameter is too large are restrained.

As to the polarizing fiber C, the refractive index $n_{s1}$ of the sea component in the direction perpendicular to the longitudinal direction was 1.51 and the refractive index $n_{s2}$ of the sea component in the longitudinal direction was 1.54.

Further, a fiber comprising only the above island component material was produced for calculating the $\Delta n_1$ and $\Delta n_2$.

Namely, a fiber having a diameter of 100 μm was produced by the above described same method except that only the island component material was spun by using the nozzle for monofilament. The refractive index of the fiber was measured. The refractive index $n_{i1}$ of the island component (fiber) in the direction perpendicular to the longitudinal direction was 1.49. The refractive index $n_{i2}$ of the island component (fiber) in the longitudinal direction was 1.50.

Accordingly, $\Delta n_1 = |n_{s1} - n_{i1}| = |1.50 - 1.49| = 0.02$. The difference $\Delta n_1$ between the refractive indexes in the direction perpendicular to the longitudinal direction is 0.02 or less, so that the polarized light in the direction perpendicular to the longitudinal direction can be restrained from being reflected, diffused, or scattered on/in the interfaces between the sea component and island component in the polarizing fiber C. As a result, the polarized light in the direction perpendicular to the longitudinal direction goes straight and permeates therethrough without being absorbed in the sea component.

Also, $\Delta n_2 = |n_{s2} - n_{i2}| = |1.54 - 1.50| = 0.04$. The difference $\Delta n_2$ between the refractive indexes in the longitudinal direction is 0.03 or more, so that the polarized light in longitudinal direction is easily reflected, diffused, or scattered on/in the interfaces between the sea component and the island component in the polarizing fiber C. As a result, the polarizing performance of the polarizing fiber C further becomes larger than the polarizing performance of a conventional polarizing fiber, which has no island regions.

Example 4

Polarizing Plate D

A polarizing plate D was produced wherein a triacetylcellulose film of 40 μm in thickness was laminated as a protective film on each of both surfaces of a polarizer having the polarizing fiber A and an isotropic material described below.

The used isotropic material was a transparent liquid epoxy resin having the refractive index $n_m$ of 1.51 after the resin was cured. Specifically, the transparent liquid epoxy resin comprises 100 parts by weight of an alicyclic epoxy resin, 124 parts by weight of methylhexahydrophthalic anhydride, and 1 part by weight of tri-n-butylphosphonium bromide.

Filaments of the polarizing fiber (polarizing fiber A) produced in Example 1 were arranged in parallel to each other on a triacetylcellulose film of 40 μm in thickness. Next, the polarizing fiber was coated with the isotropic material to envelop the polarizing fiber in the material. Furthermore, a triacetylcellulose film of 40 μm in thickness was put thereon in such a manner that air bubbles would not enter the workpiece. In this way, the polarizing fiber was sandwiched between the two TAC films. Thereafter, the resultant was subjected to curing treatment at 100° C. for 5 hours to obtain a polarizing plate D. The moiety sandwiched between the triacetylcellulose films (that is, the polarizer) had a thickness of 70 μm. The amount of the isotropic material used for 100 parts by weight of the polarizing fiber was 100 parts by weight.

As described above, the refractive index $n_m$ of the used isotropic material is 1.51. As described in the Example 1, the refractive index $n_{s1}$ of the sea component in the direction perpendicular to the longitudinal direction of the polarizing fiber A is 1.51. Accordingly, the difference between the refractive indexes, $\Delta n_3 = |n_{s1} - n_m| = |1.51 - 1.51| = 0.00$. The $\Delta n_3$ of this polarizing plate D is 0.02 or less, so that the polarized light in the direction perpendicular to the longitudinal direction can be restrained from being reflected, diffused, or scattered on/in the interfaces between the sea component and the island component in the polarizing plate D. As a result, the polarizer of the polarizing plate D easily permeates the polarized light perpendicular to the longitudinal direction and has a high transmittance.

Example 5

Polarizing Plate E

A polarizing plate E was produced wherein a triacetylcellulose film of 40 μm in thickness was laminated as a protective film on each of both surfaces of a polarizer having the polarizing fiber C and an isotropic material.

The producing method of the polarizing plate E and so on were the same as in Example 4 except that the polarizing fiber C produced in the Example 3 was used as a polarizing fiber. Thus, description thereof is omitted. Also, the sea components of the polarizing fiber A used in the polarizing plate D and the polarizing fiber C used in the polarizing plate E are the same. The isotropic material used in the polarizing plate D and the isotropic material used in the polarizing plate E are the same. Accordingly, the differences $\Delta n_3$ between the refractive indexes of the polarizer of the polarizing plate D and the polarizer of the polarizing plate E are the same and each of the polarizers has a high transmittance.

Example 6

Polarizing Plate F

A polarizing plate F was produced wherein a triacetylcellulose film of 40 μm in thickness was laminated as a protective layer on each of both surfaces of a polarizer having the isotropic material, the polarizing fiber A, and the polarizing fiber B.

The producing method of the polarizing plate F and so on were the same as in Example 4 except that the polarizing fiber A and the polarizing fiber B were used as polarizing fibers so as to set the ratio by volume of the former to the latter to 48:52. Thus, description thereof is omitted. The polarizing fiber A and the polarizing fiber B were evenly dispersed not to cause any deflection.

Also, the sea components of the polarizing fiber A and the polarizing fiber B are the same except that the used dichroic dyes are different. The isotropic material used in the polarizing plate D and the isotropic material used in the polarizing plate F are the same. Accordingly, the differences $\Delta n_3$ between the refractive indexes of the polarizer of the polarizing plate D and the polarizer of the polarizing plate E are the same, and each of the polarizers has a high transmittance.

Example 71

Polarizing Plate G

A polarizing plate G was produced wherein a triacetylcellulose film of 40 µm in thickness was laminated as a protective film on each of both surfaces of a polarizer having an isotropic material and a woven cloth.

The polarizer of the polarizing plate G is produced by using the polarizing fibers A and wefts to form the woven cloth, and enveloping this woven cloth in the same isotropic material as in the Example 4.

The woven cloth used in the polarizing plate G is a woven cloth formed by weaving warps and wefts as follows in plain weave construction.

The warps, they were formed by bunching fifty strands of polarizing fibers A produced in the Example 1.

The wefts were produced by melting and spinning resin pellets of ethylene vinyl alcohol copolymer used as a sea component of the polarizing fiber A. Here, the resin pellets used in the wefts did not comprise a dichroic dye. The diameter of each of the wefts was 50 µm.

The polarizing plate G was obtained by the same method as in the above Example 4 except that these warps and wefts were used.

The wefts and the sea component of the polarizing fiber A are the same component except that the wefts do not comprise a dichoic dye. The isotropic material used in the polarizing plate D and the isotropic material used in the polarizing plate G are the same. Accordingly, the differences $\Delta n_3$ between the refractive indexes of the polarizer of the polarizing plate D and the polarizer of the polarizing plate G are the same and each of the polarizers has a high transmittance.

Comparative Example 1

Polarizing Plate H

An iodine-dyed PVA-based polarizing plate high in transmittance and polarization degree (trade name: "NPF-SEG1425DU", manufactured by Nitto Denko Corp.) was used.

Comparative Example 2

Polarizing Fiber I

Firstly, a polarizing fiber having no sea-island structure was produced.

As to producing of the polarizing fiber I of Comparative Example 2, the material same as the sea component material of the polarizing fiber A in the Example 1 was used. Namely, the material of the polarizing fiber I was a material obtained by immersing resin pellets of an ethylene-vinyl alcohol copolymer having a melting point of 181° C. and a melt flow index of 12 g/10 min (trade name: "SOANOL (transliterated) DC3212B", manufactured by Nippon Synthetic Chemical Industry Co., Ltd.) in a 2% water solution of a dichroic dye (trade name: "Congo Red", manufactured by Kishida Chemical Co., Ltd.) at 90° C. for 4 hours, washing the pellets with water, and then drying the pellets sufficiently in a vacuum drier.

A polarizing fiber was obtained by use of the nozzle for monofilament spinning and the same material to melt extrusion molding, and pulling out the resultant at a pulling-out speed of 600 m/min. At this time, the spinning temperature was set to 230° C. Also, the obtained polarizing fiber had a diameter of 40 µm. Further, this polarizing fiber was drawn 2.5 times in hot water of 70° C. temperature to obtain a polarizing fiber I having a diameter of 25 µm. The refractive index $n_{p1}$ of the polarizing fiber I in the direction perpendicular to the longitudinal direction was 1.50. The refractive index $n_{p2}$ of the polarizing fiber I in the longitudinal direction was 1.54.

(Birefringent Fiber)

The same EVA resin pellets used in the above polarizing fiber I were used except that the resin pellets were not dyed with a dichroic dye. A birefringent fiber was obtained by use of the nozzle for monofilament spinning for subjecting undyed resin pellets to melt extrusion molding, and pulling out the resultant at a pulling-out speed of 600 m/min. At this time, the spinning temperature was set to 230° C. This birefringent fiber was drawn in hot water of 90° C. temperature to obtain a birefringent fiber having a diameter of 10 µm. The refractive index $n_{o1}$ of the birefringent fiber in the direction perpendicular to the longitudinal direction was 1.50. The refractive index $n_{o2}$ of the birefringent fiber in the longitudinal direction was 1.54.

Polarizing Plate J

A polarizing plate J was produced wherein a triacetylcellulose film of 40 µm in thickness was laminated as a protective film on each of both surfaces of the polarizer having the above polarizing fiber I and the above birefringent fiber.

The producing method of the polarizing plate J and so on were the same as in Example 4 except that the polarizing fiber I and the birefringent fiber were used so as to set the ratio by volume of the former to the latter to 4:5. Thus, description thereof is omitted. The polarizing fiber I and the birefringent fiber were evenly dispersed not to cause any deflection.

As described above, the refractive index $n_m$ of the used isotropic material is 1.51. The refractive index $n_{p1}$ of the polarizing fiber I in the direction perpendicular to the longitudinal direction is 1.50. The difference between the refractive indexes, $\Delta n_3 = |n_{p1} - n_m| = |1.50 - 1.51| = 0.01$. Namely, the $\Delta n_3$ of the polarizing plate J is 0.02 or less, so that the polarized light in the direction perpendicular to the longitudinal direction can be restrained from being reflected, diffused, or scattered on/in the interfaces between the polarizing fiber I and the isotropic material.

The refractive index $n_{o1}$ of the birefringent fiber in the direction perpendicular to the longitudinal direction is also 1.50, so that the difference between the refractive indexes, $\Delta n_3' = |n_{o1} - n_m| = |1.50 - 1.51| = 0.01$. Namely, the $\Delta n_3'$ of the polarizing plate J is 0.02 or less, so that the polarized light in the direction perpendicular to the longitudinal direction can be restrained from being reflected, diffused, or scattered on/in the interfaces between the birefringent fiber and the isotropic material.

On the other hand, as described above, the refractive index $n_{o2}$ of the birefringent fiber in the longitudinal direction is 1.54, so that the difference between the refractive indexes, $\Delta n_4 = |n_{o2} - n_m| = |1.54 - 1.51| = 0.03$. The difference $\Delta n_4$ between the refractive indexes of the polarizing plate J in the longitudinal direction is 0.03 or more, so that the polarized light parallel to the longitudinal direction is easily reflected, diffused, or scattered on/in the interfaces between the birefringent fiber and the isotropic material.

The polarizing plate J is produced by coating the polarizing fiber I and the birefringent fiber with the isotropic material to envelop the fibers in the material. In the polarizing plate J, the interfaces of the polarizing fiber I do not directly contact the interfaces of the birefringent fiber. It is therefore hardly significant to calculate out $\Delta n_1=|n_{p1}-n_{o1}|$, $\Delta n_2=|n_{p2}-n_{o2}|$, and $\Delta n_3=|n_{p1}-n_m|$. Thus, the interfaces between the polarizing fiber I and the birefringent fiber, and the isotropic material were examined as described above.

[Evaluating Methods]
(Polarization Function of Polarizing Fibers)

The polarization function of the polarizing fibers of Examples 1 to 3 and Comparative Example 2 (that is, the polarizing fibers A, B, C and I) was examined. Specifically, a commercially available polarizing plate was used to take out a linearly polarized light in the direction perpendicular to the longitudinal direction of each of the polarizing fibers. The linearly polarized light was radiated to the polarizing fiber, and the light transmitted through the polarizing fiber was observed with the naked eye. Next, a linearly polarized light parallel to the longitudinal direction of the polarizing fiber was radiated thereto in the same way, and the light transmitted through the polarizing fiber was observed with the naked eye.

(Transmittance and Polarization Degree of Polarizing Plates)

About the polarizing plates of Examples 4 to 7 and Comparative Examples 1 to 2 (that is, the polarizing plates D, E, F, G, H and J), an integrating-sphere-attached spectrophotometer (product name: "U-4100", manufactured by Hitachi Ltd.) was used to calculate out the transmittance and the polarization degree at a wavelength of 550 nm.

(Color Tone of Polarizing Plates)

About each of the polarizing plates of Examples 4 to 7 and Comparative Examples 1 to 2, the degree of the color of the plate was observed with the naked eye.

(Unevenness in Polarizing Plates)

Each of the polarizing plates of Examples 4 to 7 and Comparative Examples 1 to 2 was cut into pieces, 5 cm (in the cross sectional direction)×20 cm (in the longitudinal or drawn direction), with pinking shears for handcrafts. Each of the pieces was attached to a glass plate 0.7 mm in thickness. The resultants were used as samples. In generally, when such a product is cut with pinking shears, a crack described below is more easily generated. Two out of the same samples were made into a cross nicol state, and then observed on a high-brightness backlight with the naked eye. It was then checked whether each of the samples (polarizing plates) turned uneven or not.

(Crack in Polarizing Plates)

The individual samples were cooled at −30° C. for 60 minutes, and then heated at 80° C. for 60 minutes. This cold and heat cycle test was conducted 100 times. Thereafter, two of the same samples were made into a cross nicol state, and then it was observed whether each of the samples (polarizing plates) was cracked or not with the naked eye.

[Evaluation Results and Study]
(Polarization Function of Polarizing Fibers)

When the linearly polarized light in the direction perpendicular to the longitudinal direction was radiated to each of the polarizing fibers, the light transmitted through the polarizing fibers was approximately transparent and colorless about each one of the polarizing fibers. When the linearly polarized light parallel to the longitudinal direction was radiated to each of the polarizing fibers, the light transmitted through each one of the polarizing fibers was colored in accordance with the absorption wavelength of the dichroic dye. Accordingly, it is understood that any one of the polarizing fibers A, B, C and I expressed a polarization function.

(Transmittance, Polarization Degree of Polarizing Plates, and Unevenness and Crack Therein)

The measurement results of the transmittance and polarization degree of each of the polarizing fibers, and unevenness and a crack therein are shown in Table 1. About each of the unevenness and the crack, a case where it was generated is represented by "x", and a case where it was not generated is represented by "○".

| Samples | Polarizing fiber | Structure or the like | Transmittance | Polarization degree | Unevenness | Crack |
|---|---|---|---|---|---|---|
| Example 4: polarizing plate D | A | Sea-island | 44.7 | 99.50 | ○ | ○ |
| Example 5: polarizing plate E | C | Core-sheath | 44.1 | 99.20 | ○ | ○ |
| Example 6: polarizing plate F | A + B | Sea-island | 43.0 | 99.91 | ○ | ○ |
| Example 7: polarizing plate G | A | Plain weave | 39.1 | 99.00 | ○ | ○ |
| Comparative Example 1: polarizing plate H | — | Blank | 43.5 | 99.95 | ○ | x |
| Comparative Example 2: polarizing plate J | I | Monofilament | 44.5 | 98.00 | ○ | ○ |

When Examples 4 to 7 are compared with Comparative Example 1, a crack was generated in Comparative Example 1. Accordingly, it is understood that the polarizing plate H of Comparative Example 1 may be cracked under the severe conditions (100 cycles of the cold-heat cycle test). The polarizing-fiber-used polarizing plates, including Comparative Example 2, were not cracked.

When Examples 4 to 7 are compared with Comparative Example 2, as to Comparative Example 2, the same dichroic dye as in Example 1 was used and further the transmittance thereof was also approximately equal to that of Example 1, but a polarization degree was lower than Examples 4 to 7. The causes therefor are assumed as follows. Firstly, in Comparative Example 2, it was difficult to arrange the polarizing fiber and the birefringent fiber evenly and in parallel to each other when the polarizing plate was produced. If these cannot be arranged evenly and in parallel to each other, the difference between the transmittances to the polarized light parallel to the longitudinal direction of the fiber and that to the polarized light in the direction perpendicular thereto does not become large, so that the polarization degree is declined. Secondly, a problem about the workabilities of the polarizing fiber and the birefringent fiber is cited. In Comparative Example 2, the polarizing fiber and the birefringent fiber were separately produced; thus, it is assumed that a sufficiently fine fiber failed in being obtained so that scattering in the interface between the two fibers was not effectively used.

When Example 4 is compared with Example 5, the polarizing plate D was slightly better than the polarizing plate E in each of transmittance and polarization degree although the dichroic dyes comprised in the polarizing fibers were the same. This would be because the island number per filament of the polarizing fiber was one in the polarizing plate E while the island number per filament of the polarizing fiber was 12 in the polarizing plate D. In other words, in the polarizing plate D, the island number was 2 or more, and thus the polarized light that was transmitted through the polarizing fiber and was parallel to the longitudinal direction easily underwent multiple reflection, multiple diffusion or multiple scattering. It is considered that this matter made high the probability that the polarized light was absorbed in the sea component of the polarizing plate D.

When Example 4 is compared with Example 7, the polarizing plate D was slightly better than the polarizing plate G in each of transmittance and polarization degree although the same polarizing fiber A was used. In the polarizer that the polarizing plate D had, the filaments of the polarizing fiber A were lined with each other so that the filaments of the fiber A were arranged in parallel to each other. On the other hand, in the polarizer that the polarizing plate G had, the polarizing fiber A was made into the woven cloth, thus, the polarizing fiber A were not arranged in sufficiently parallel to each other. This matter would be a cause for the above. However, the polarization degree of the polarizing plate G was better than that of Comparative Example 2. When the polarizing fiber A is formed into a woven cloth of plain weave, the workability thereof is good when a polarizer is made therefrom; therefore, the polarizing plate G can be more easily produced.

(Color Tone of Polarizing Plates)

It has been understood from the observation with the naked eye that the polarizing plate F according to Example 6 was further restrained from being colored than the polarizing plates D, E, F, which were corresponding to Examples 4, 5 and 7, respectively. In the polarizing plate F, the two polarizing fibers A and B were used. It is therefore suggested that the use of two polarizing fibers comprising dichroic dyes different from each other makes it possible to uniform light-absorption-unevenness depending on wavelengths.

INDUSTRIAL APPLICABILITY

The polarizing fiber of the present invention may be used as a forming material of a polarizer, for example.

By laminating a proper optical member on the polarizer, a polarizing plate or a laminated optical film may be provided.

The polarizer, the polarizing plate, and the laminated optical film may be used for an image display.

What is claimed is:

1. A polarizing fiber having an absorption axis in a longitudinal direction thereof; wherein
    a cross sectional form perpendicular to the longitudinal direction has a sea-island structure, the cross sectional form being made up in the longitudinal direction;
    a resin that constitutes a sea region of the sea-island structure comprises a dichroic dye;
    a resin that constitutes island regions of the sea-island structure is a transparent resin;
    the number of the island regions is 2 or more; and
    a long diameter of each of the island regions is from 0.1 to 8.0 μm, and wherein when the refractive index of the resin that constitutes the island regions in a direction perpendicular to the longitudinal direction is represented by $n_{i1}$ and the refractive index of the resin that constitutes the sea region in the direction perpendicular to the longitudinal direction is represented by $n_{s1}$, the difference between the refractive indexes, $\Delta n_1 = |n_{s1} - n_{i1}|$, is 0.02 or less; and
    when the refractive index of the resin that constitutes the island regions in the longitudinal direction is represented by $n_{i2}$ and the refractive index of the resin that constitutes the sea region in the longitudinal direction is represented by $n_{s2}$, the difference between the refractive indexes, $\Delta n_2 = |n_{s2} - n_{i2}|$, is 0.03 or more and 0.05 or less.

2. The polarizing fiber according to claim 1, wherein the resin that constitutes the sea region is polyvinyl alcohol or ethylene vinyl alcohol copolymer.

3. A polarizer in a sheet form, wherein the polarizing fiber as recited in claim 1 is arranged or laminated in parallel to the longitudinal direction thereof, and is further enveloped in a transparent isotropic material.

4. The polarizer according to claim 3, wherein when the refractive index of the isotropic material is represented by $n_m$ and the refractive index of the resin that constitutes the sea region in the direction perpendicular to the longitudinal direction is represented by $n_{s1}$, the difference between the refractive indexes, $\Delta n_3 = |n_{s1} - n_m|$, is 0.02 or less.

5. An image display, having the polarizer as recited in claim 4.

6. A laminated optical film, having the polarizer as recited in claim 4.

7. A polarizing plate, having a transparent protective film on at least one surface of the polarizer as recited in claim 3.

8. A laminated optical film, having the polarizing plate as recited in claim 7.

9. An image display, having the polarizing plate as recited in claim 7.

10. A laminated optical film, having the polarizer as recited in claim 3.

11. An image display, having the laminated optical film as recited in claim 10.

12. An image display, having the polarizer as recited in claim 3.

* * * * *